June 4, 1940. J. P. JOHNSON 2,202,912
GEAR PUMP AND RELIEF VALVE
Filed March 17, 1938 2 Sheets-Sheet 1

INVENTOR.
JAMES P. JOHNSON
BY
ATTORNEY.

June 4, 1940.   J. P. JOHNSON   2,202,912
GEAR PUMP AND RELIEF VALVE
Filed March 17, 1938   2 Sheets-Sheet 2

INVENTOR.
JAMES P. JOHNSON
BY
ATTORNEY.

Patented June 4, 1940

2,202,912

UNITED STATES PATENT OFFICE 2,202,912

GEAR PUMP AND RELIEF VALVE

James P. Johnson, Shaker Heights, Ohio, assignor, by mesne assignments, to Pump Engineering Service Corporation, Cleveland, Ohio, a corporation of Ohio Application March 17, 1938, Serial No. 196,409

1 Claim. (Cl. 103—42)

This invention relates to hydraulic pumps and more particularly to the gear type, embodying certain improvements which make it particularly adaptable for use on aircraft.

For low pressures, not exceeding 200 pounds per square inch, the rotary type pump is desirable and examples of its use are with Gyropilot installations and for pressure heating systems.

For higher pressures, however, ranging from 200 to 1500 pounds per square inch, the gear type pump is much more efficient, especially where the operating speed runs from 1000 to 4000 R. P. M. Pumps of this type are used in the operation of landing gear, flaps, brakes, wing tip floats, turrets, etc., and most effectively because of their wide range of pressures regardless of engine speeds.

It is, therefore, an object of the present invention to provide a high pressure gear pump capable of high lift, smoothness of operation, lack of pulsation and ability to develop and operate under whatever pressure is desired regardless of pump speed.

Another object of the present invention is to provide means for maintaining a constant pressure of the discharged fluid irrespective of variation in the pump speed.

Another object of the present invention is to mount the fluid relief means in such a manner that the direction of rotation of the gear pump may be reversed without dismantling any of the operating parts of the latter.

Another object of the invention is to provide an improved relief valve structure whereby hammering between the valve and its seat is eliminated thereby increasing the life of the pump unit materially.

A further object of the invention is to provide a simple and expedient means for changing the operative position of the relief valve to conform with the direction of rotation of the gear pump.

With the objects above indicated and other objects hereinafter explained in view, my invention consists in the construction and combination of elements hereinafter described and claimed.

Referring to the drawings.

Figure 1:
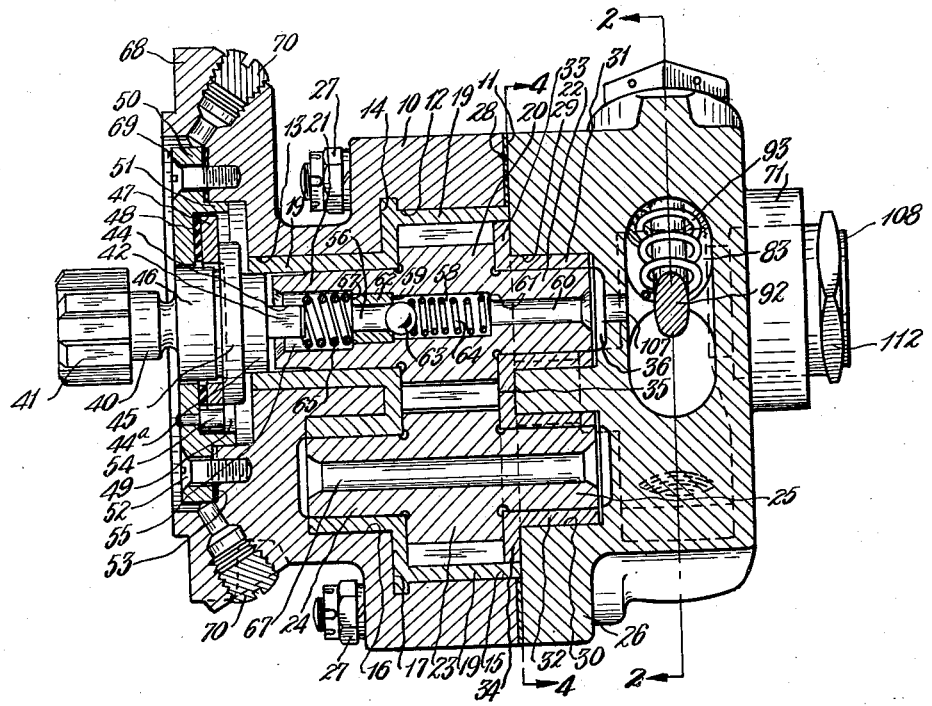
Figure 1 is a longitudinal sectional view taken on line 1—1 in Figure 2 showing a detail of the pump and relief valve assembly embodying the present invention.

In the drawings, I have illustrated one type of gear pump and relief valve embodying the present invention but the specific structure and arrangement are in no manner restrictive, the application of the invention to other structures being readily recognized by those skilled in the particular art.

I have not shown in the drawings of the present case, details of the pump structure, as reference should be had to my copending application, Serial No. 196,692, filed March 18, 1938, wherein the novel features are claimed. For a clear understanding of the complete unit, however, a description of the pump structure will be hereafter set forth.

The pump comprises a housing 10, preferably an aluminum casting for lightness, although other suitable material may be used which has the desired characteristics. One end of the housing 10 is provided with a flat smooth surface 11 from which an axial opening 12 extends inwardly therefrom and communicates with an axial opening 13 of smaller diameter, extending inwardly from the opposite end of the housing 10 providing a transverse wall 14. Positioned below the opening 12 is a second opening 15 preferably of the same diameter as the opening 12, which likewise, extends inwardly from the flat surface 11 and communicates with a bore 16 of smaller diameter, but preferably of the same diameter as the opening 13, providing a transverse wall 17 which forms a continuation of the wall 14. The axes of the openings 12 and 13 are coaxial as are the axes of the opening 15 and bore 16, and while spaced apart the respective axes are in parallelism. Furthermore, the openings 12 and 15 slightly overlap at their adjacent portions affording communication between the openings.

The openings 12, 13, 15, and bore 16 are all heavily lined with a suitably bearing material 19 such as bronze which may be inserted in any desirable manner. However, it is preferable to first cast the bronze insert to the shape desired and then to cast the aluminum material around the insert. By the so-called ram-up casting, it is possible to obtain a rigid union between the insert and cast aluminum and one in which the insert is of such thickness as to be substantially unaffected by contraction of the aluminum covering due to atmospheric conditions in actual use.

An external gear 20 is positioned within the opening 12 and has its teeth adapted for running engagement with the inner peripheral surface of the bearing material. The gear 20 is provided with axial extensions 21 and 22 which project outwardly on opposite sides and the extension 21 is rotatably mounted in the bearing material adjacent the opening 13. A second external gear 23 is positioned within the opening 15 and has its teeth adapted for running engagement with the inner peripheral surface of the adjacent bearing material. The gear 23 is provided with axial extensions 24 and 25 which project outwardly on opposite sides and the extension 24 is rotatably mounted in the bearing material adjacent the opening 16. The teeth of both gears 20 and 23 are in meshing engagement adjacent the communicating portions of the openings 12 and 15.

A cover member 26 is positioned upon the flat surface 11 of the housing 10 and detachably connected to the latter by a plurality of bolts 27 and a gasket 28 is disposed between the cover and housing to provide a fluid tight joint. The cover member 26 has axial bores 29 and 30 extending outwardly which are in coaxial alignment with the opening 13 and bore 16 in the housing. These bores also have inserts or liners of bushing material and in the present instance comprise tubular extensions 31 and 32 disposed within their respective bores and circumferential integral flanges 33 and 34 at their inner ends, the adjacent peripheral portions of the flanges being flattened at 35 to prevent relative rotation. The extensions 22 and 25 of the gears 20 and 23 are also rotatably mounted in the bushing extensions 31 and 32 respectively and the peripheral edge of the flanges 33 and 34 fit closely within the outer end of the openings 12 and 15, to permit the inner faces to engage the adjacent ends of the gears and to hold the opposite ends of the gears in engagement with the bearing material on the transverse walls 14—17. With this arrangement the gears and their extensions are substantially entirely surrounded by the bearing material and it being of substantial thickness is unaffected by contraction occurring in the aluminum covering due to changes in atmosphere conditions, thereby providing a free running gear mounting.

Figures 6, 7:
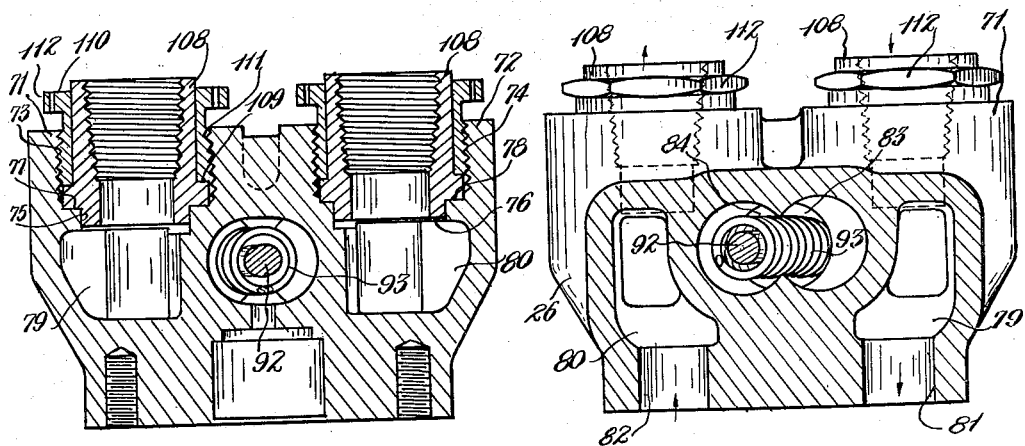
Figure 6 is a transverse sectional view taken on line 6—6 in Figure 4 and showing the fluid passageways and the inlet and outlet openings in detail.
Figure 7 is a transverse sectional view taken on line 7—7 in Figure 2 and showing the fluid passageways connected to the fluid openings into the pump.

The cover 26 has a pair of bosses 71—72 formed integral therewith which project rearwardly on opposite sides in spaced relation. The bosses have interiorly screwthreaded openings 73—74 respectively which extend inwardly from their outer ends and communicate with coaxially aligned openings 75—76 of smaller diameter to provide shoulders 77—78. The cover is further provided with a pair of passageways 79—80 arranged upon opposite sides and which are normally non-communicative. The opening 75 of the boss 71 communicates with the passageway 79 while the opening 76 of the boss 72 communicates with the passageway 80 as more clearly shown in Figure 6.

Figures 4, 5:
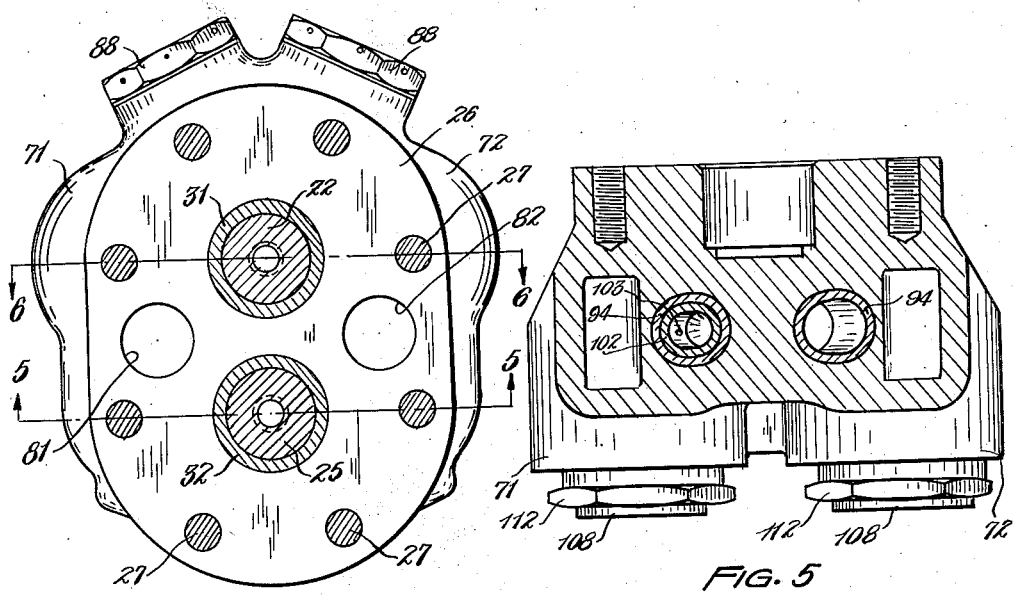
Figure 4 is a transverse sectional view taken on line 4—4 in Figure 1 and showing the fluid openings into the pump.
Figure 5 is a transverse sectional view taken on line 5—5 in Figure 4 and showing the various fluid passageways.

An opening 81 is provided on the inner side of the cover and extends outwardly into communication with the passageway 79. An opening is similarly provided on the inner side of the cover but on the diametrically opposite side and extends outwardly into communication with the passageway 80, this arrangement being more clearly shown in Figures 4 and 7. The housing 10 is provided with passageways which extend inwardly from the flat surface 11 and communicate at their inner ends with the opposite sides of the meshing gears. These passageways function as inlet and outlet for the fluid depending upon the direction of rotation of the gears and should therefore be of similar area. The openings 81—82 therefore, should align with the respective passageways in the housing so as to afford communication between the pumping gears and openings 73 and 74 in the bosses, the function of these openings as inlet or outlet being dependent upon the direction of rotation of the gears.

The circuit of the fluid is complete in the foregoing assembly but the pressure of the discharged fluid will vary in direct proportion to the speed of the gears. Therefore, when a constant pressure of the discharged fluid is desired irrespective the pump speed, a relief valve is incorporated in the structure to obtain the desired result. Relief valves are in a general sense, old and well known, but types in use in the past have embodied certain structural features which rendered them inefficient especially when adapted for aircraft purposes.

Figures 2, 3:
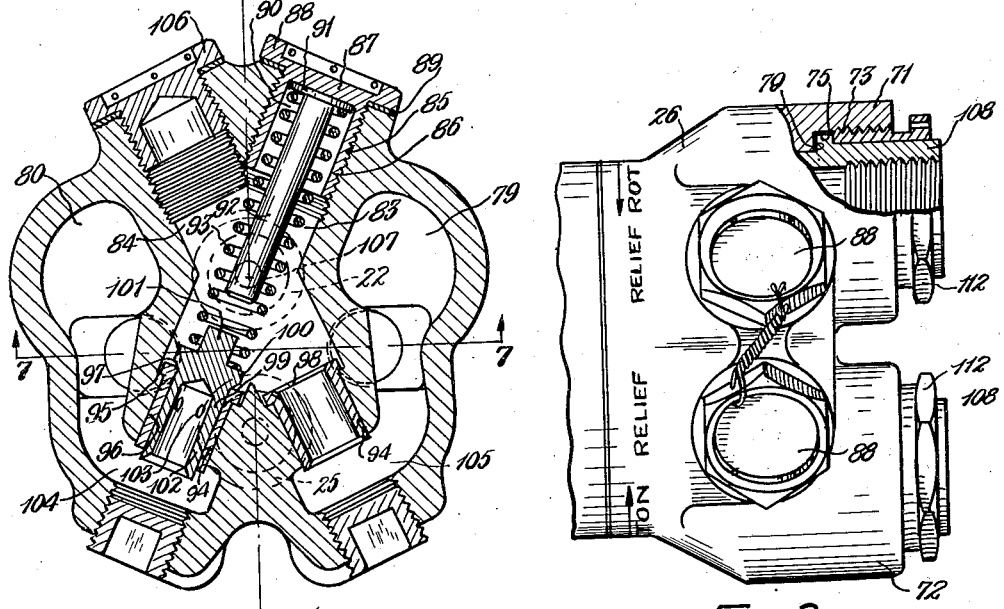
Figure 2 is a transverse sectional view taken on line 2—2 in Figure 1 and showing the relief valve in detail.
Figure 3 is a top fragmentary view of the relief valve cover showing the position of the relief ports and a portion broken away to show one of the fluid openings.

In the present instance, a relief valve is embodied of improved construction and which materially increases the efficiency of the pump operation. The cover member 26 is provided with a pair of fluid relief passageways 83—84 of duplicate form which extend diagonally on opposite sides of a central plane passing through the axes of the gear extensions 22—25 and which intersect adjacent the axis of the extension 22 to provide communication therebetween. Inasmuch as the interior of both passageways are identical, it is believed sufficient to describe in detail the passageway 83 in which the relief valve is mounted. The outer end of the passageway 83 is interiorly screwthreaded at 85 to receive the screwthreaded extension 86 of a plug 87. The plug 87 has a hexagonal head 88 to accommodate a wrench or other tool and when secured tightly into place engages a gasket 89 to provide a fluid tight seal with the adjacent portion of the cover, as more clearly shown in Figure 2. The extension 86 is recessed at 90 upon its inner end to freely receive the head or flange 91 of a pin 92 which projects inwardly centrally thereof. A coiled spring 93 encircles the pin 92 and has its outer end disposed within the recess 90 in engagement with the head 91. The lower portion of the passageway 83 has a portion 94 of slightly smaller diameter to provide a shoulder 95 and secured within the portion 94 is a tubular bushing member 96 having a laterally extending flange 97 at its inner end in engagement with the shoulder 95, the inner end of the tubular member being formed as a valve seat 98. A valve member 99 has a valve head 100 provided with an inwardly tapered surface engageable with the valve seat and an inwardly extending axial projection 101. The inner end of the spring 93 encircles the projection 101 and is in engagement with the adjacent face of the valve head for normally urging said valve head into engagement with its valve seat. The tension of the spring may be varied in any desirable manner but in the present instance shims (not shown) may be positioned between the head 91 and the bottom of the recess 90. The valve member 99 is further provided with a depending tubular extension 102 which is slidably mounted in the tubular member 96 and a plurality of transversely extending openings 103 are provided in the tubular extension 102 a considerable distance below the valve seat. These openings are positioned so that the fluid which enters the open end of the tubular extension 102 and raises the valve head from its seat will move the valve head relatively a sufficient distance before the fluid passes through the openings 103 so that there is no possibility of hammering therebetween thus increasing the efficiency and life of the pump assembly materially.

The open end of the valve member is connected by a passageway 104 with the passageway 80 while the lower end of the relief passageway 84 is connected by a similar passageway 105 with the passageway 79. When the drive gear 20 is rotated in the direction of the arrows shown on the views, suction is created in the passageway 79 causing the fluid to be drawn in through the opening 73, being the inlet opening in this instance. The incoming fluid passes through the opening 81 of the cover into the inlet side of the pump housing and to the inlet side of the rotating gears. Here it is forced around the gears and discharged at high pressure from the outlet side of the gears where it flows through the outlet opening in the housing, through the opening 82 in the cover, into the passageway 80 and out through the outlet opening 74 where it is conveyed by suitable conduit to the instrumentalities which it is to actuate. To insure that the pressure of the discharged fluid will be substantially constant, excess fluid from the passageway 80 flows downwardly through the passageway 104 and into the open end of the valve member. The pressure of the fluid raises the valve member off its seat so that the fluid may flow thereby after the valve member has moved sufficiently to expose the openings 103 thereby permitting the fluid to pass outwardly and to be discharged into the relief valve passageway 84 where it returns to the inlet opening 79 through passageway 105.

The open end of the relief valve passageway 84 is normally closed by a screwthreaded plug 106 in sealing relation and when it is desired to operate the pump gears in the direction opposite to that indicated and described, the respective plugs 87 and 106 are removed and interchanged, the valve member, spring, and pin being assembled in the relief valve passageway 84 in the identical relation as that heretofore described. With this rearrangement the function of the openings and passageways is reversed, that is, those that were the inlet are now outlet and those that were the outlet are now the inlet. It will be further noted that in the present structure an opening 107 is provided in the cover 26 for connecting the end of the bore 29 with the inlet side of the pump for a purpose to be later described.

To adapt the relief valve cover 26 for connection with pipes or conduits of different sizes, an interiorly screwthreaded adaptor 108 is provided which has a lateral flange 109 removably fitting within each of the threaded openings 73 and 74 and seating upon the shoulder 77. The adaptor has a hollow extension which fits snugly within the opening 75. A lock nut 110 encircles the adaptor and has an extension 111 exteriorly screwthreaded which cooperates with the threaded opening 73 and has its lower end securely engaging the upper face of the flange 109. The nut 110 is provided with a hexagonal head 112 to accommodate a wrench or other tool. The adaptor is removable and replaceable with similar adaptors having different threaded openings.

The gear 20 may be driven by any suitable means but preferably a drive shaft 40 of steel, is provided which has a splined outer end 41 adapted for connection with the aircraft engine for positive rotation therefrom. The shaft extends through the end of the housing and has a transverse projection 42 upon its inner end which slidably fits within transversely aligned recesses 44 provided in the adjacent end of the extension 21. Outwardly of the projection 42 the shaft 40 is provided with an enlarged circular portion 44a which is disposed within and has a close running fit with the inner peripheral surface of the bearing material adjacent the opening 13. The inner face of the enlarged circular portion 44a is spaced slightly from the outer end of the extension 21 and is thereby limited in its movement axially in that direction.

Outwardly of the portion 44 the shaft 40 is provided with a circumferential flange 45 of larger diameter than that of the portion 44 and the outer face of the flange is machined smooth and true. About midway of its ends the shaft 40 is provided with an enlarged circular portion 46 of smaller diameter than that of the flange 45 and positioned outwardly of the latter. An inherently rigid disc 47 of bronze or other bearing material, is disposed outwardly of the flange 45 and has a central opening through which the enlarged portion 46 of the drive shaft freely extends. A flexible disc 48 of duprene and fabric or other similar material, is disposed outwardly of the disc 47 and housed within a circular recess 49 provided upon the inner side of an end plate 50. The end plate 50 has an inwardly extending circular flange 51 adapted to fit closely within a recessed opening in the adjacent end of the housing and is detachably connected to the latter by a plurality of screws 52. A gasket 53 is disposed at the outer marginal portion between the end plate 50 and the adjacent portion of the housing to provide a fluid tight joint. The discs 47 and 48 are secured to the end plate 50 in any suitable manner to prevent rotation and in the present instance have aligned openings to receive the free end of a pin 54 which has its opposite end rigidly connected to the end plate as more clearly shown in Figure 1. As many of these pins may be employed as desired, so as to maintain the discs in proper relation. The machined surface of the flange 45 has a running engagement with the adjacent surface of the disc 47 and the flange is forced into sealing engagement with the disc 47 by the pressure created within the pump housing during operation. The flexible disc 48 is provided to compensate for any misalignment of the drive shaft 40 without affecting the efficiency of the seal contact between the flange 45 and disc 47.

It will be appreciated that in view of the fact that the pressure within the pump increases tremendously and in direct proportion to the speed of the gears, it would be unsafe and injurious to the elements forming the seal if they were subjected to such high pressures for any length of time. Furthermore, the effectiveness of the seal can be maintained with relatively less pressure and to accomplish this result means is provided for bleeding the oil from adjacent the seal and returning it to the inlet side of the pump. In the present instance the drive gear 20 is provided with an axial opening extending entirely through it and its extensions. This opening is of large diameter at 55 and communicates with a portion 56 of smaller diameter at its inner end forming a shoulder 57. The opening has a portion 58 of smaller diameter than the portion 56 thus providing a shoulder 59. The opening has a further portion 60 of smaller diameter than the adjacent portion 58 thereby providing a shoulder 61 at its inner end, the outer end communicating with the adjacent end of the bore 29 in the cover 26. A tubular member 62 is secured within the portion 56 of the opening and seats against the shoulder 59, its inner end providing a valve seat. A ball valve member 63 is movably mounted in the portion 58 of the opening and engageable with the valve seat. A coiled spring 64 has one end engageable with the ball valve member 63 and its other end engageable with the shoulder 61 to normally maintain the valve member in engagement with its valve seat. A second coiled spring 65 is disposed within the portion 55 of the opening and has one end in engagement with the transverse projection 42 on the inner end of the drive shaft while its opposite end is in engagement with the shoulder 56 and the adjacent end of the tubular member 59 are normally urging the flange 45 into sealing engagement with the disc 47.

The tension of the coiled springs is predetermined so that the pressure exerted by the spring 65 and the pressure of the oil retained adjacent the seal is the effective sealing pressure, the excess oil passing through the opening 55, the opening in the tubular member 59 thereby unseating the valve member 63 and permitting flow through the portions 58 and 60 of the opening where it discharges into the bore 29 of the cover. The cover 26 is provided with a passageway 107 communicating with the bore 29 and the inlet opening 36 so that the oil discharged into the bore 29 is returned to the inlet opening. The gear 23 and its extensions may also be provided with an axial opening 67 extending entirely therethrough and having its outer end connecting with the bore 38 of the cover 26 whereby any oil may be discharged therefrom into the bore 30 and ultimately to the inlet opening 36.

The housing has a squared flange 68 formed integral with the end adjacent the drive shaft and is provided with openings 69 by means of which the housing is suitably attached to the engine housing. A plurality of drain plug connections 70 are provided for draining any oil which might enter from the engine.

It is believed that a detailed description of the operation of the pump will not be necessary in view of the foregoing description.

While I have described the preferred embodiment of the invention it is to be understood that I am not to be limited thereto inasmuch as changes and modifications may be resorted to without departing from the spirit of the invention as defined in the appended claim.

What is claimed is:

In a gear pump, a housing, a pair of external meshing pump gears rotatably mounted in said housing and adapted for operation in either direction, said housing being provided with passageways communicating respectively with the opposite sides of said meshing gears for the admission and discharge of fluid, a cover member detachably connected to said housing and having fluid inlet and outlet openings adapted for connection respectively with the fluid supply and a fluid pressure actuated instrumentality and connecting passageways communicating respectively with the aforesaid passageways in said housing, said cover member being further provided with a pair of substantially similar intersecting relief passageways normally establishing communication between said connecting passageways, tubular members coaxially secured within said relief passageways and having valve seats disposed relatively toward the suction side depending upon the direction of rotation of said pump gears, a valve member having a valve head engageable with one of said valve seats when said pump gears rotate in one direction for controlling the flow of fluid thereby and a depending tubular extension slidably mounted in the adjacent tubular member, said tubular extension having one or more transversely extending openings disposed outwardly from said valve head to permit flow of fluid past said valve seat, the free end of said tubular extension being disposed to the pressure side, a coiled spring disposed longitudinally within one of said relief passageways and having one end in engagement with said valve head for normally maintaining the latter in engagement with said valve seat, and a pin adjustably and interchangeably mounted in the outer ends of said relief passageways, said pin being engageable with the outer end of said spring whereby the tension of the latter may be varied as desired to effect discharge of the fluid at substantially a constant pressure regardless of variations in the speed of said pump gears, said valve member and spring being removable and insertable into one or the other of said relief passageways depending upon the desired direction of rotation of said pump gears without the necessity for disassembly of the pumping elements.

JAMES P. JOHNSON.